United States Patent [19]

Scheppele

[11] 4,189,240
[45] Feb. 19, 1980

[54] MIXER FOR ANIMAL FEED

[75] Inventor: Lyle W. Scheppele, Dubuque, Iowa

[73] Assignee: Toledo Stamping & Manufacturing Company, Toledo, Ohio

[21] Appl. No.: 7,882

[22] Filed: Jan. 31, 1979

[51] Int. Cl.[2] .................. A23N 17/00; B01F 5/26
[52] U.S. Cl. .................. 366/186; 366/297; 366/302; 366/337; 366/603
[58] Field of Search .......... 366/186, 279, 297, 298, 366/300, 302, 303, 304, 305, 306, 307, 337, 603

[56] References Cited

U.S. PATENT DOCUMENTS

| 2,159,856 | 5/1939 | MacLean | 366/307 |
| 2,626,786 | 1/1953 | McGlothlin | 366/303 X |
| 2,914,385 | 11/1959 | Massey et al. | 366/307 X |
| 3,254,877 | 6/1966 | Goodwin | 366/302 X |

*Primary Examiner*—Philip R. Coe
*Attorney, Agent, or Firm*—Allen D. Gutchess, Jr.

[57] ABSTRACT

An in-line mixer for animal feed is provided. The mixer receives feeds from a plurality of sources, mixes the feeds in a short distance, and deposits the mixed feed on a conveyor which carries it to animal feeding stations. The mixer includes a housing forming an upright passage containing baffles and rapidly rotating agitator blades which maintain the feeds in a fluidized condition and accomplish the mixing operation in a short time. Consequently, the mixer itself is short and requires relatively little space.

10 Claims, 4 Drawing Figures

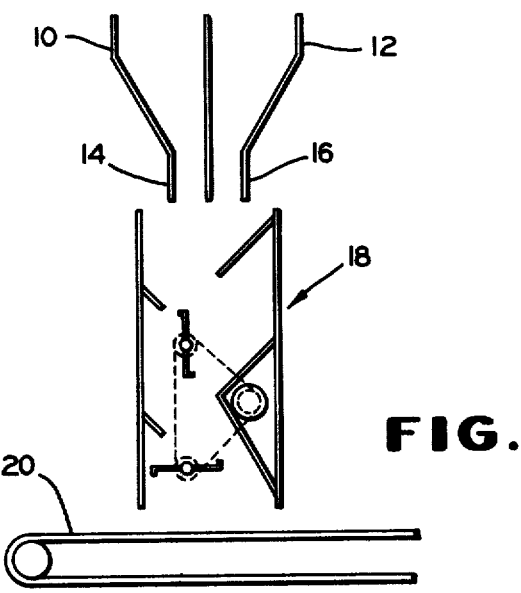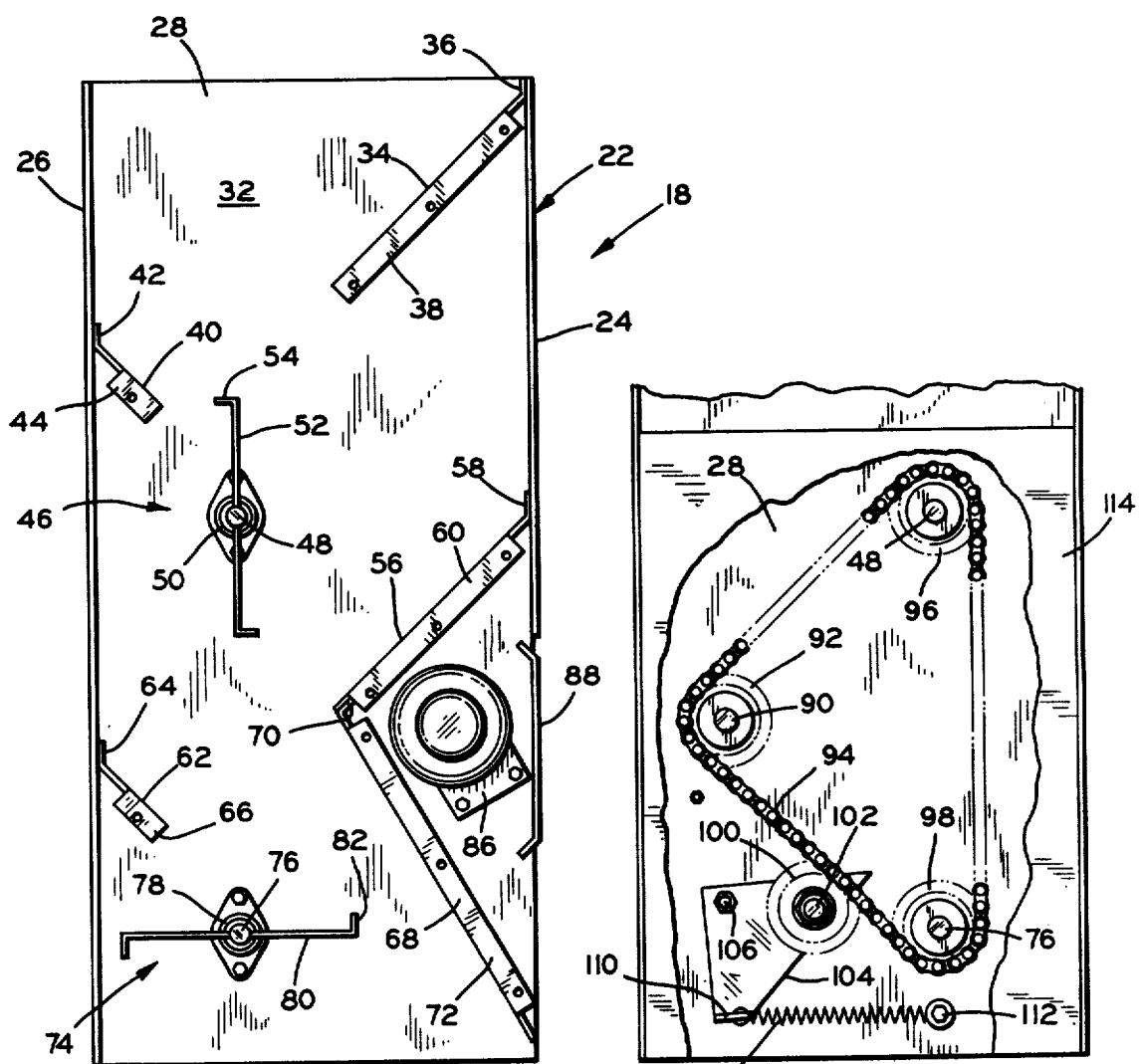

MIXER FOR ANIMAL FEED

This invention relates to an in-line mixer for mixing animal feed.

Feeding farm animals, such as cattle and pigs, is becoming more sophisticated. Carefully metered quantities of a variety of different feeds and supplements are often now mixed and fed to the animals to provide maximum fattening at minimum costs.

The present invention provides an in-line mixer for mixing a plurality of different feeds. The mixer includes a housing forming an upright passage, to the upper end of which is supplied feeds from a plurality of sources. The feeds, which are usually carefully metered prior to entering the mixer, are discharged at the bottom of the passage in a thoroughly mixed condition. From here, the mixed feed can be deposited on a conveyor which carries it to animal feeding stations. In some instances, the mixed feed can be additionally mixed with other feeds or supplements prior to being fed to the animals.

The mixer passage has a plurality of carefully positioned baffles therein which direct the feeds to rapidly rotating agitator blades. These throw the feeds against other baffles which enables the feeds to be thoroughly mixed in a short time so that the overall mixer itself can be short and consume minimal space. The blades maintain the feeds in a fluidized state which promotes the rapid mixing.

It is, therefore, a principal object of the invention to provide a mixer for animal feeds which thoroughly mixes the feeds in a short time and distance.

Many other objects and advantages of the invention will be apparent from the following detailed description of a preferred embodiment thereof, reference being made to the accompanying drawings, in which:

FIG. 1 is a schematic view in elevation, with parts broken away, of a plurality of sources of feeds, an in-line mixer according to the invention, and a conveyor;

FIG. 2 is an enlarged view in elevation of the mixer of FIG. 1, with a side wall removed;

FIG. 3 is a fragmentary view in elevation, taken from the opposite side of the mixer, with a shroud broken away to show the drive arrangement.

Figure 4:
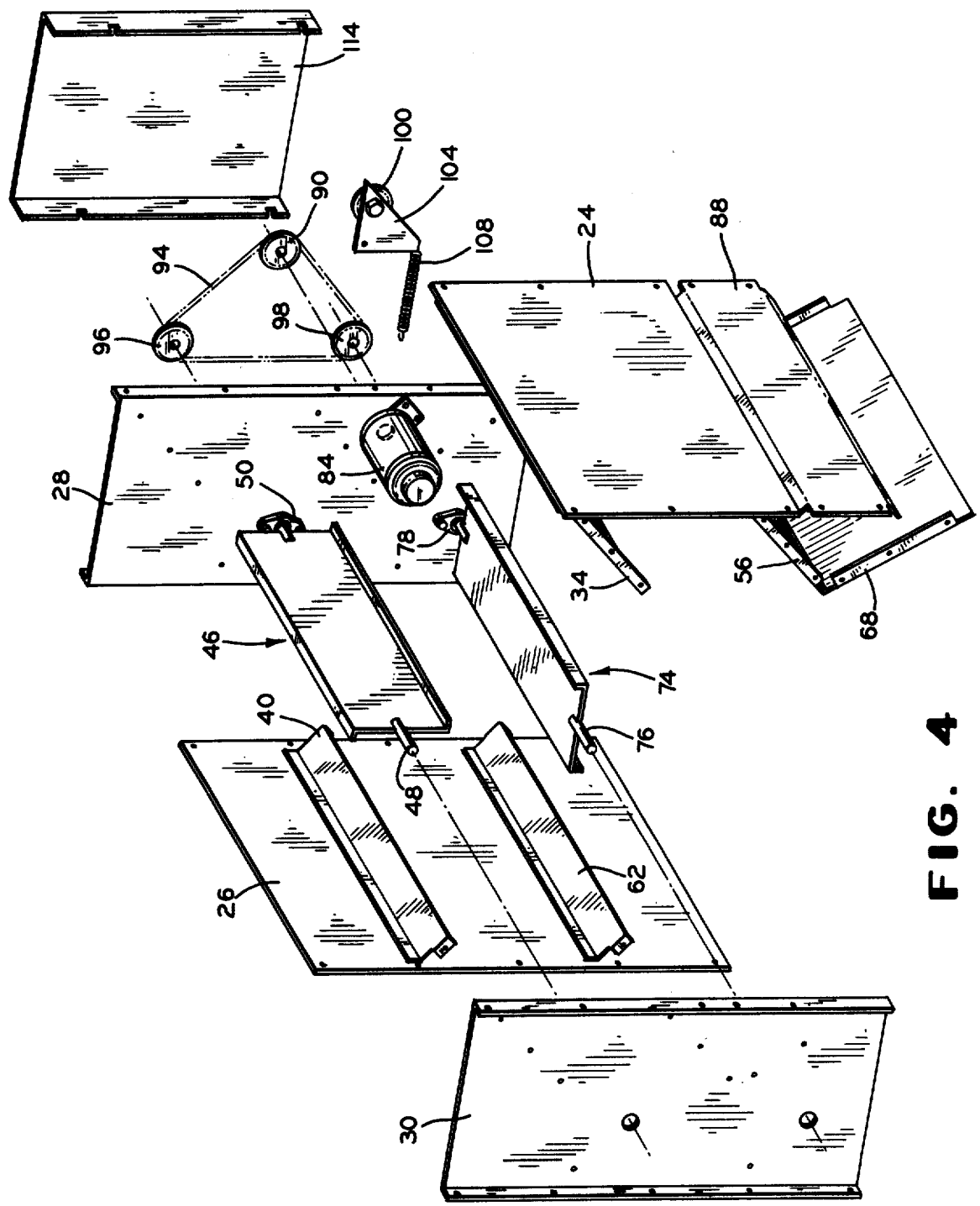
FIG. 4 is an exploded view in perspective of the mixer.

Referring to FIG. 1, a plurality of sources or hoppers 10 and 12 of feed supply the feeds through chutes 14 and 16 to an in-line mixer 18 according to the invention. The mixer 18 thoroughly mixes the feeds in a short time and in a short distance, depositing the mixed feed on a conveyor 20. The conveyor can carry the mixed feed to animal feeding stations or the mixed feed may be further mixed with other feeds or supplements. The feeds are first carefully metered to provide the optimum mixed feed for fattening the animals at minimum costs.

The mixer 18 includes a housing 22 having a first side wall 24, a second side wall 26, a back wall 28, and a front wall 30 (FIG. 4). The housing 22 thereby forms a relatively short, generally vertical passage 32 extending from a position near the bottom of the chutes 14 and 16 to a position just above the conveyor 20.

A first baffle 34 is located in an upper portion of the passage 32 and slants downwardly and inwardly at an angle of about forty-five degrees toward the center of the passage 32 from the first side wall 24, but terminates short of the center of the passage. The baffle 34 has an upper flange 36 which is affixed to an upper edge portion of the side wall 24 and has end flanges 38 which are affixed to the back wall 28 and the front wall 30. The baffles can be affixed to the walls through nuts and bolts (not shown) or could otherwise be suitably affixed thereto, as by spot welding.

A second baffle 40 is located in the passage 32 below the first baffle 34 and slants downwardly and inwardly at an angle of about forty-five degrees toward the center of the passage from the second side wall 26. This baffle, which is much shorter than the first baffle 34, is affixed to the side wall 26 by an upper flange 42 and is affixed to the front and back walls 28 and 30 by end flanges 44.

A first agitator 46 is located below the first and second baffles. The agitator 46 includes stub axles 48 held in bearings 50 which are suitably mounted in the back and front walls 28 and 30. An agitator blade 52 is affixed to the axles 48 and has edge stiffening flanges 54 at the outer edges thereof. The blade 52 extends near the side wall 26 and also extends across the center of the passage 32 when in a horizontal position. The blade 52 also is sufficiently wide to exceed the horizontal distance between the inner edges of the baffles 34 and 40. The agitator blade 52 rotates at a speed such that it throws the feeds as they move downwardly through the passage 32, rather than merely stirring the feeds. As such, the feeds move through the passage in a fluidized flow condition, rather than a choke-fed condition.

A third baffle 56 slants downwardly and inwardly at an angle of about forty-five degrees from the first side wall 24, stopping short of the center of the passage 32. The third baffle 56 is affixed to the first side wall 24 by an upper flange 58 and is affixed to the back and front walls 28 and 30 by end flanges 60, having a width approximately equal to the width of the first baffle 34.

A fourth baffle 62 is located below the third baffle 56 and slants inwardly and downwardly at an angle of about forty-five degrees from the second side wall 26. The baffle 62 has an upper flange 64 which affixes the baffle 62 to the side wall 26 and has end flanges 66 which affix the baffle 62 to the back wall 28 and the front wall 30. The baffle 62 has a width about equal to that of the second baffle 40, with both the second and fourth baffles primarily serving to direct the feeds away from the second side wall 26 so they will be struck by the agitator blades.

A fifth baffle 68 is located below the third baffle 56 and mostly below the fourth baffle 62. The fifth baffle 68 extends inwardly and upwardly at an angle of about fifty degrees to the horizontal from the side wall 24. The baffle 68 has an upper flange 70 which is affixed to the inner surface of the lower edge of the baffle 56. The baffle 68 also has end flanges 72 which are affixed to the back and front walls 28 and 30.

A lower agitator 74 is located below the fourth baffle 62 and by the fifth baffle 68. The agitator 74 has stub axles 76 rotatably carried by bearings 78 mounted in the back and front walls 28 and 30. An agitator blade 80 with edge stiffening flanges 82 is affixed to the axles 76. The agitator blade 80 extends near the second side walls 28 and across the center of the passage 32 when in a horizontal position. The width of the blade 80 also exceeds the horizontal distance between the inner edge of the fourth baffle 62 and the inner edges of the third and fifth baffles 56 and 68. The agitator blade 80 is also rotated at a high speed, preferably at the same speed as the blade 52, to strike and throw the feeds rather than merely stirring them. This speed can be from about 100 to 150 rpm and preferably about 130 to 140 rpm. The blade 80 throws the feed against the fifth baffle 68 from which it is deflected downwardly toward the conveyor 20.

For driving the agitators 46 and 74, a gear motor 84 is provided. The motor 84 is located within the mixer 18 itself to achieve further compactness for the overall mixer and to protect the motor from possible damage and dust. The motor 84 can be mounted on the back wall 28 by a mounting plate 86 and is located within the space defined by the third baffle 56 and the fifth baffle 68 which, in effect, form a housing for the motor, protecting it from the feeds in the mixer passage 32. A side panel 88 is located below the side wall 24, forming ventilating openings for the motor 84 above and below the panel.

Referring to FIG. 3, the motor 84 has a drive shaft 90 extending through the back wall 28 where it is affixed to a drive sprocket 92. This sprocket 92 engages a chain 94 which drives a driven sprocket 96 affixed to the stub axle 48 of the upper agitator 46. Similarly, the chain 94 engages a driven sprocket 98 affixed to the axle 76 of the lower agitator 74. An idler or take-up sprocket 100 engages an intermediate portion of the chain 94 to take up slack. The sprocket 100 is rotatably mounted by a stub shaft 102 on a mounting plate 104 which is pivotally supported on the back wall 28 by a pivot 106. The sprocket 100 is urged against the chain 94 by a spring 108 which is connected to the plate 104 through a hole 110 and to a bolt 112 affixed to the back wall 28. A safety shroud 114 encloses the various drive components.

The new mixer is effective to thoroughly mix the feeds in a relatively short distance and takes up little space. The agitators 26 and 74 are important in achieving the effective mixing along with the baffles, including the fifth baffle 68 which defects the mixed feed from the agitator 74 downwardly.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A mixer for receiving and mixing different animal feeds, said mixer comprising a housing forming a generally vertical passage, a first baffle in said passage slanted downwardly and inwardly toward the center of the passage from a side thereof, a second baffle in said passage slanted downwardly and inwardly toward the center thereof from the side opposite said first baffle, a third baffle in said passage below said first baffle and on the same side of said passage as said first baffle and extending upwardly and inwardly toward the center of said passage from the side and terminating adjacent the inner edge of said first baffle, an agitator including an agitator blade below said first and second baffles and rotatably mounted in an intermediate portion of said passage, said blade having a sufficient width to exceed the horizontal distance between the inner edges of said first and second baffles when said blade is in a horizontal position, said third baffle being positioned to receive feed thrown from said agitator blade and deflect it downwardly, and means for driving said agitator blade at a high rate to maintain the feed contacted thereby in a fluidized condition.

2. A mixer according to claim 1 characterized by said drive means comprising a motor located in said passage between said first baffle and said third baffle.

3. A mixer for receiving and mixing different feeds, said mixer comprising a housing including a first side wall, a second side wall parallel thereto, a back wall extending between said side walls, and a front wall extending between said side walls, said housing forming a generally vertical passage, a first baffle in said passage slanting downwardly and inwardly from the first side wall, a second baffle in said passage below said first baffle and slanted downwardly and inwardly from said second side wall, an upper agitator blade below said first and second baffles and rotatably supported by said back and front walls, a third baffle in said passage below said second baffle and slanted downwardly and inwardly from said first side wall, said third baffle being positioned to receive feeds thrown from said agitator blade, a fourth baffle in said passage below said third baffle and extending downwardly and inwardly from said second side wall, a lower agitator blade below said third and fourth baffles and rotatably supported by said back and front walls, said lower agitator blade being rotatable about an axis parallel to the axis of rotation of said upper agitator blade, a fifth baffle in said passage below said third baffle and extending upwardly and inwardly from said first side wall, said fifth baffle being positioned to receive feeds thrown from said lower agitator blade, and means for rotating said agitator blades.

4. A mixer according to claim 3 characterized by said drive means comprising a motor located in said passage between said third and fifth baffles.

5. A mixer according to claim 3 characterized by said drive means rotating said agitator blades at a high speed to maintain the feeds in a fluidized condition.

6. A mixer according to claim 5 characterized by said blades being rotated from about 100 to about 150 rpm.

7. In combination, a plurality of sources of different feeds, a conveyor, and a mixer for receiving and mixng the different feeds and depositing the mixed feed on the conveyor, said mixer comprising wall means forming a generally vertical passage, a first baffle in said passage slanted downwardly and inwardly toward the center of the passage from a side thereof, a second baffle in said passage below said first baffle and slanted downwardly and inwardly toward the center of said passage from the side opposite said first baffle, an upper agitator blade below said first and second baffles and rotatably mounted in an intermediate portion of said passage on an axis parallel to planes of said first and said second baffles and extending across the center of said passage when in a horizontal position, a third baffle in said passage below said second baffle and on the same side as said first baffle and slanted downwardly and inwardly toward the center of said passage from the side, said third baffle being positioned to receive feed from said agitator blade, a fourth baffle in said passage below said third baffle and on the same side as said second baffle and slanted downwardly and inwardly toward the center of said passage from the side, a lower agitator blade below said third and fourth baffles and rotatably mounted in an intermediate portion of said passage on an axis parallel to the planes of said third and fourth baffles and extending across the center of said passage when in a horizontal position, a fifth baffle in said passage below said third baffle and on the same side as said third baffle and extending upwardly and inwardly toward the center of said passage from the side and terminating near the inner edge of said third baffle, said fifth baffle being positioned to receive feed from said lower agitator blade, a motor in said passage between said third baffle and said fifth baffle, and means driven by said motor for rotating said agitator blades.

8. A mixer according to claim 7 characterized by said motor and said driven means rotating said blades at high speed to maintain the feeds in a fluidized condition.

9. A mixer according to claim 8 characterized by said blades being rotated from about 100 to about 150 rpm.

10. The combination according to claim 7 characterized by the cross section of said passage being rectangular with said first, third and fifth baffles being affixed to a side wall which is parallel to a side wall to which said second and fourth baffles are affixed, with said lower agitator blade and said upper agitator blade being rotatably mounted in opposite, parallel side walls which are perpendicular to the two side walls to which the baffles are affixed.

* * * * *